& Porcello Co.# United States Patent [19]

Bogden et al.

[11] Patent Number: 5,057,647
[45] Date of Patent: Oct. 15, 1991

[54] LOW RISE FLOORING STRUCTURE

[76] Inventors: Emil A. Bogden, 1357 W. Sixth Ave., Columbus, Ohio 43212; Jeffrey S. Bogden, 285 Galloway Rd., Galloway, Ohio 43119

[21] Appl. No.: 445,434

[22] Filed: Dec. 4, 1989

Related U.S. Application Data

[63] Continuation-in-part of Ser. No. 187,042, Apr. 27, 1988, abandoned.

[51] Int. Cl.⁵ ............................................. H02G 3/28
[52] U.S. Cl. ......................................... 174/48; 52/221
[58] Field of Search ................... 174/48; 52/220, 221, 52/263

[56] References Cited

U.S. PATENT DOCUMENTS

| | | | |
|---|---|---|---|
| 1,574,586 | 2/1926 | Loucks et al. | 52/506 |
| 1,784,368 | 12/1930 | Loucks | 52/519 |
| 2,867,301 | 1/1959 | Benton | 52/263 |
| 2,950,575 | 8/1960 | Hellwig | 52/221 |
| 3,037,746 | 6/1962 | Williams | 52/220 X |
| 3,094,745 | 6/1963 | Stout | 52/506 |
| 3,217,211 | 11/1965 | Norden | 361/338 |
| 3,842,320 | 10/1974 | Kiesling | 361/331 |
| 3,852,928 | 12/1974 | Raith | 52/263 |
| 3,903,667 | 9/1975 | Zetlin | 52/227 |
| 4,060,294 | 11/1977 | Haworth et al. | 439/215 |
| 4,194,332 | 3/1980 | Fork | 52/220 |
| 4,295,697 | 10/1981 | Grime | 439/215 |
| 4,313,646 | 2/1982 | Millhimes | 439/654 |
| 4,421,367 | 12/1983 | Shannon et al. | 439/95 |
| 4,438,610 | 3/1984 | Fifer | 52/263 |
| 4,488,390 | 12/1984 | Mulford | 52/407 |
| 4,578,910 | 4/1986 | Germeroth | 52/105 |
| 4,593,499 | 6/1986 | Kobayashi et al. | 52/220 X |
| 4,596,095 | 6/1986 | Chalfant | 52/126.6 |
| 4,630,417 | 12/1986 | Collier | 52/263 |

FOREIGN PATENT DOCUMENTS

| | | |
|---|---|---|
| 673746 | 11/1963 | Canada . |
| 3024501 | 1/1982 | Fed. Rep. of Germany . |
| 1355184 | 6/1974 | United Kingdom . |
| 1388275 | 3/1975 | United Kingdom . |

OTHER PUBLICATIONS

IBM Technical Disclosure Bulletin entitled "Modular Raised Floor", vol. 12, No. 6, Nov. 1969, p. 827.

Primary Examiner—Gerald P. Tolin
Assistant Examiner—David A. Tone
Attorney, Agent, or Firm—Emch, Schaffer, Schaub & Porcello Co.

[57] ABSTRACT

A low rise false flooring structure designed for use in applications where it is desirable to maximize the distance between the false floor and the ceiling and also maximize the space or chase under the false floor above the base floor structure. Fireproof fibrous pads provide structural integrity to thin metal panels to construct the flooring panels of the false floor. Knockout plates provide openings in each flooring panel to access the chase.

14 Claims, 7 Drawing Sheets

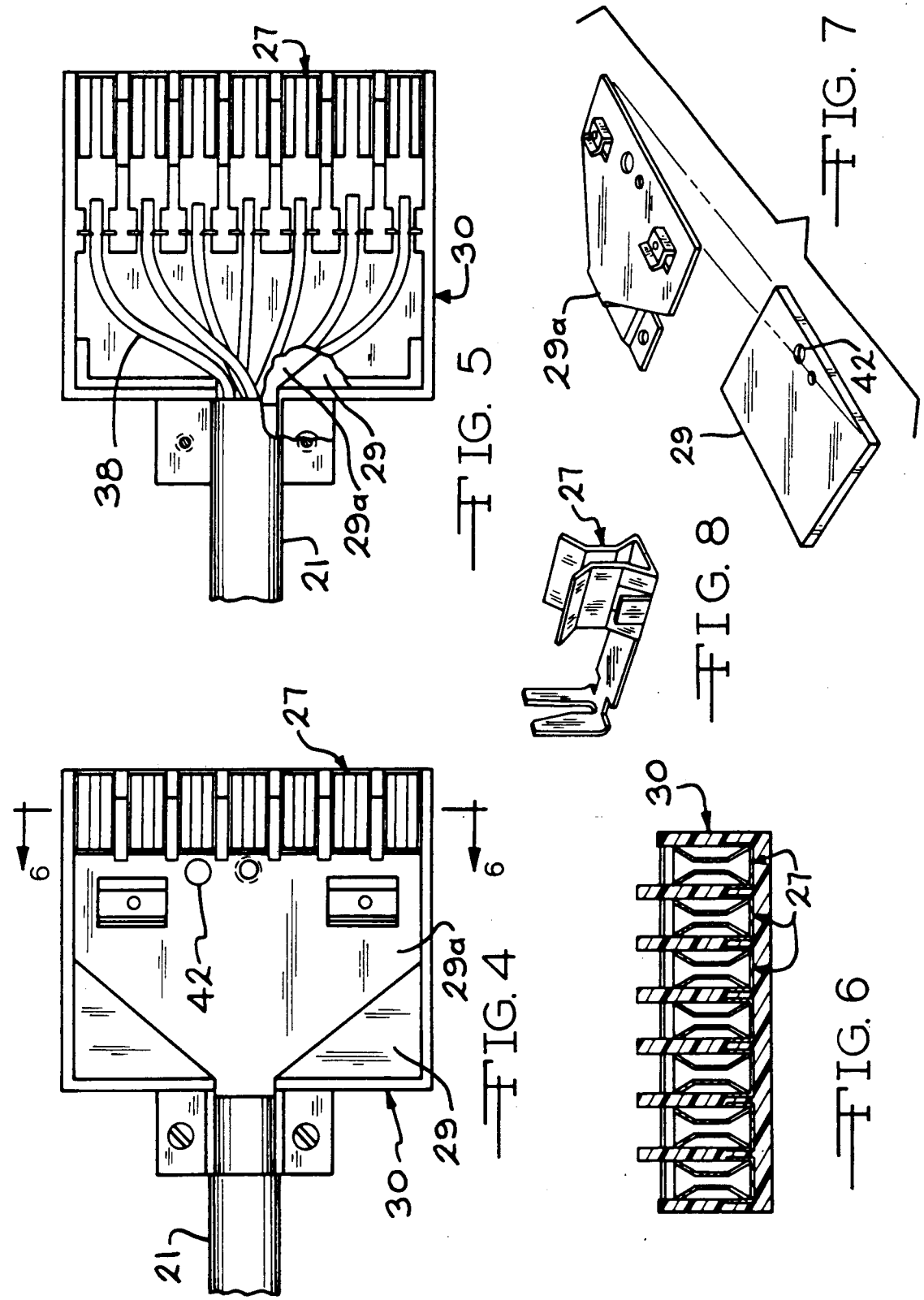

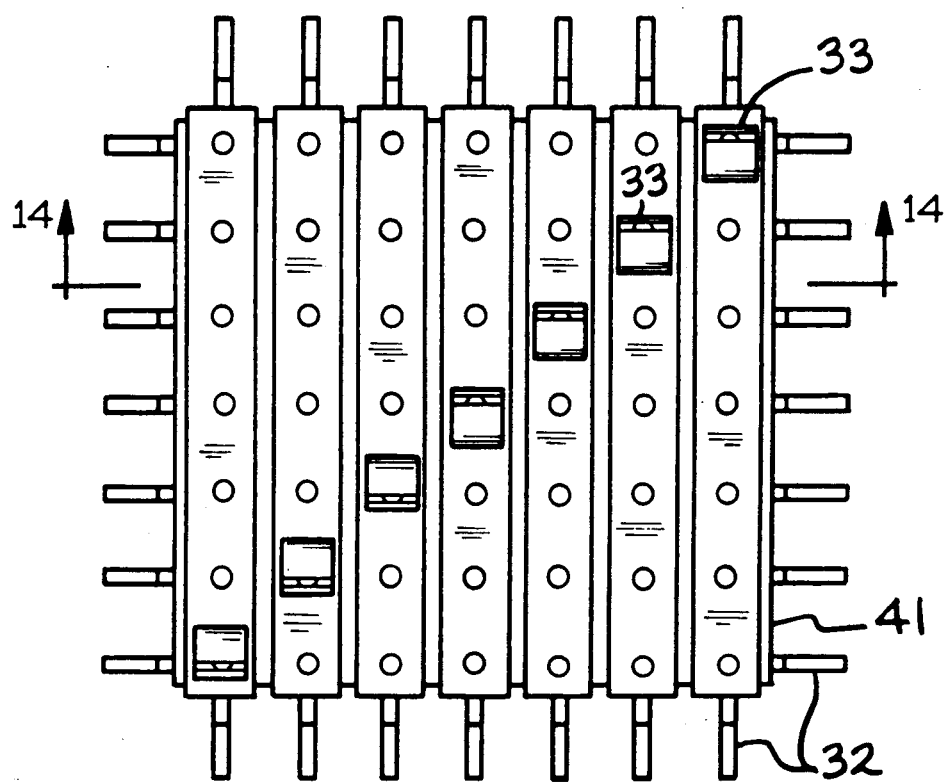
FIG. 13
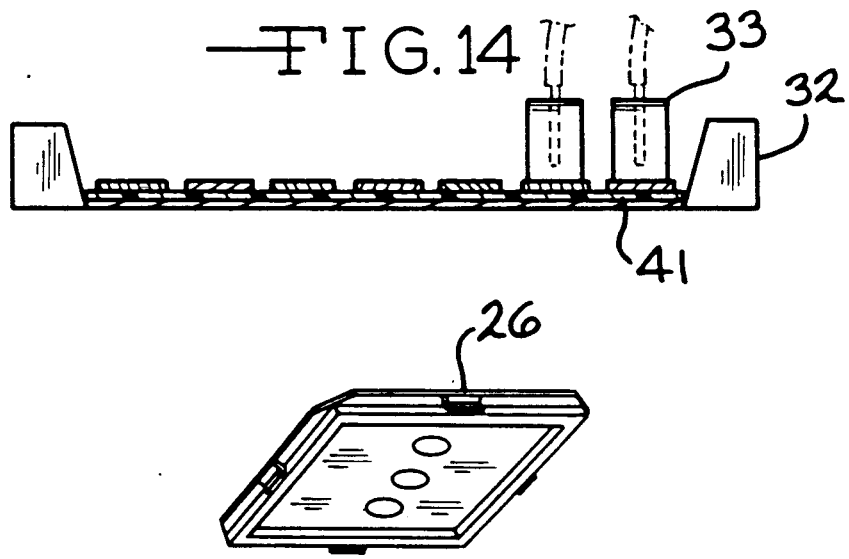
FIG. 14
FIG. 15

LOW RISE FLOORING STRUCTURE

This is a continuation-in-part of copending application Ser. No. 07/187,042 filed on Apr. 27, 1988 abandoned.

BACKGROUND OF THE INVENTION

The invention relates generally to a deck or flooring structure intended to be placed over an existing base floor structure. More specifically, the invention is directed to a flooring structure which minimizes the overall profile or height of the flooring structure while maximizing the height of the space or chase between the flooring panels of the flooring structure and the existing base floor structure.

The application of false flooring to the construction of office buildings is now an established and known method for providing a versatile facility that will contain electrical equipment, data equipment and telephone equipment and yet be adaptable in some way to alterations in the placement of such equipment within the office building. The use of such false flooring provides accessible space for the placement of all forms of wiring as demanded by such equipment. Also the false flooring facilitates the ease of adapting changes in the existing wiring demands created by the introduction of additional electrical, data, and telecommunications equipment to the facility at minimum cost and effort. Thus, desire to provide a solution for these needs has led to the invention of a variety of false floor structures intended to provide specific distinct advantages. See, for example, U.S. Pat. Nos. 2,867,301; 3,852,928; 3,903,667; 4,438,610; 4,578,910 and 4,596,095.

All of these false flooring systems suffer from one or more deficiencies. In many systems, the flooring panels are supported by relatively thin legs or braces. Therefore, the flooring panel itself must be heavily constructed and reinforced so as to provide sufficient structural integrity to the flooring panel. Such flooring panels are expensive to manufacture and their great weight can create serious problems during installation, replacement, and removal. Some other systems use a flooring panel constructed in such a manner that the floors will issue an annoying hollow sound when walked upon, after complete installation of the floor.

There are also considerations and limitations on the structure of the false flooring system which are dictated by the space requirements of the office building. For instance, if the building is an older building with established floor and ceiling heights, the installation of false flooring may diminish the floor to ceiling height undesirably as well as create problems with existing door jambs and thresholds and elevator thresholds. A great many times, if the doors and elevators cannot be adjusted to meet the false floor, the false flooring must be ramped to provide the desired clearance through the thresholds. Also, the architecture of many buildings dictates the presence of floor to ceiling windows. If a false flooring or deck system is installed, it may be visible from the exterior of the building, thus creating an undesirable sense of aesthetics about the building. Thus, when planning a false flooring system, the limitations of building structure and architecture demand that the space above the false floor be maximized and that the space below the false floor also be maximized.

Maximization of the space or chase below the false floor or deck structure is a priority for a number of reasons. The electrical, telephone, and data communications systems must all be able to extend their wiring through the chase. In the case of a low rise or profile deck system, such as the present invention, the floor panels or deck plates of the known prior art systems are too thick in construction to provide sufficient underdeck space if, for instance, the overall profile of the deck is to be four inches or less.

Therefore, it is an object of the present invention to provide a false flooring or deck system which minimizes the overall height or profile of the false floor while maximizing the height of the chase under the false floor.

It is another object of the present invention to provide a false flooring or deck system in which the flooring panels are of minimized thickness without sacrificing the structural strength of the false floor.

It is yet another object of the present invention to provide a false flooring system which does not have a hollow sound when walked upon.

It is a further object of the present invention to provide accessibility to the chase of the false flooring system without necessitating disassembly of the deck structure.

SUMMARY OF THE INVENTION

The present invention is directed to an improved low rise flooring structure for placement over an existing base structure. The individual floor panels which make up the entire false flooring structure are constructed of generally thin metal sheets and are supported by wide fibrous pads. The fibrous pads are of sufficient cross-sectional area that the thin flooring panels are sufficiently supported and have the desired structural strength and integrity. The fibrous flooring pads also serve to dampen the potential for hollow sounds to emanate from the flooring structure when the structure is walked upon.

The overall height of the false flooring structure is intended to be no more than four inches and no less than one-quarter of an inch above the base floor. The thin flooring panel, supported by the fibrous pads allows a maximization of the space below the flooring panel so that data and communications can be wired into the chase.

Each flooring panel includes a knockout plate which has sufficient structural integrity to provide support and strength to the panel when in place. Each knockout plate may also be removed to provide an access opening to the chase to allow accessibility to the wiring and communications data cables from the upper surface of the false flooring system. A distribution block may be placed in the access opening. The distribution block is connected to an underlying prewired modular electrical whip unit for carrying electricity and may also provide access to other underlying data and communications cables from the upper surface of the deck.

BRIEF DESCRIPTION OF THE DRAWINGS

FIG. 4 is a top view of an end connector at the end of each prewired modular electrical whip unit.

FIG. 5 is an open view of the end connector of FIG. 4 showing the internal wiring of each prewired modular electrical whip unit.

FIG. 6 is a sectional end view of an end connector at the end of each prewired modular electrical whip unit taken along the line 6—6 of FIG. 4.

FIG. 7 is an exploded view of the metal cover plate and plastic cover plate that cover the wire connections inside the end connector.

FIG. 8 is a perspective view of an electrical contact clip.

FIG. 13 is a plan view of a wiring assembly that distributes electricity in four different directions at once out of the distribution block and up to the duplex outlets.

FIG. 14 is a sectional view of the wiring assembly taken along lines 14—14 of FIG. 13; and, FIG. 15 is a perspective view of the clip that holds the four corners of the flooring panels together.

DETAILED DESCRIPTION OF THE PREFERRED EMBODIMENTS

Figure 1:
FIG. 1 is a fragmentary plan view of the false flooring structure according to the present invention.

The low rise flooring system of the present invention is shown in FIG. 1. The flooring system includes a false floor assembly 10 which is constructed of individual flooring panels 18 tied together by clips 26. The flooring panels 18 shown in the present embodiment each have four knockout plates 19 designed to provide an access opening through the panel 18. The knockout plates 19 can be removed and a distribution block 20 can be placed in the access opening for interconnection with a modular electrical whip 21. The distribution blocks 20 and electrical whips 21 can be dispersed under the false floor assembly 10 to provide electrical power at any desired access opening. For instance, in FIG. 1, whip 21A is connected to a power source 22 located in the wall 17 and runs to the distribution block 20A. Modular whip 21B then extends between blocks 20A and 20B. Modular whip 21C extends between blocks 20B and 20C. Thus, the electrical connections between the blocks 20 and the whips 21 can be used to provide electrical output above the surface of the false floor assembly 10 at any of the access openings made available via the knockout plates 19.

Figure 2:
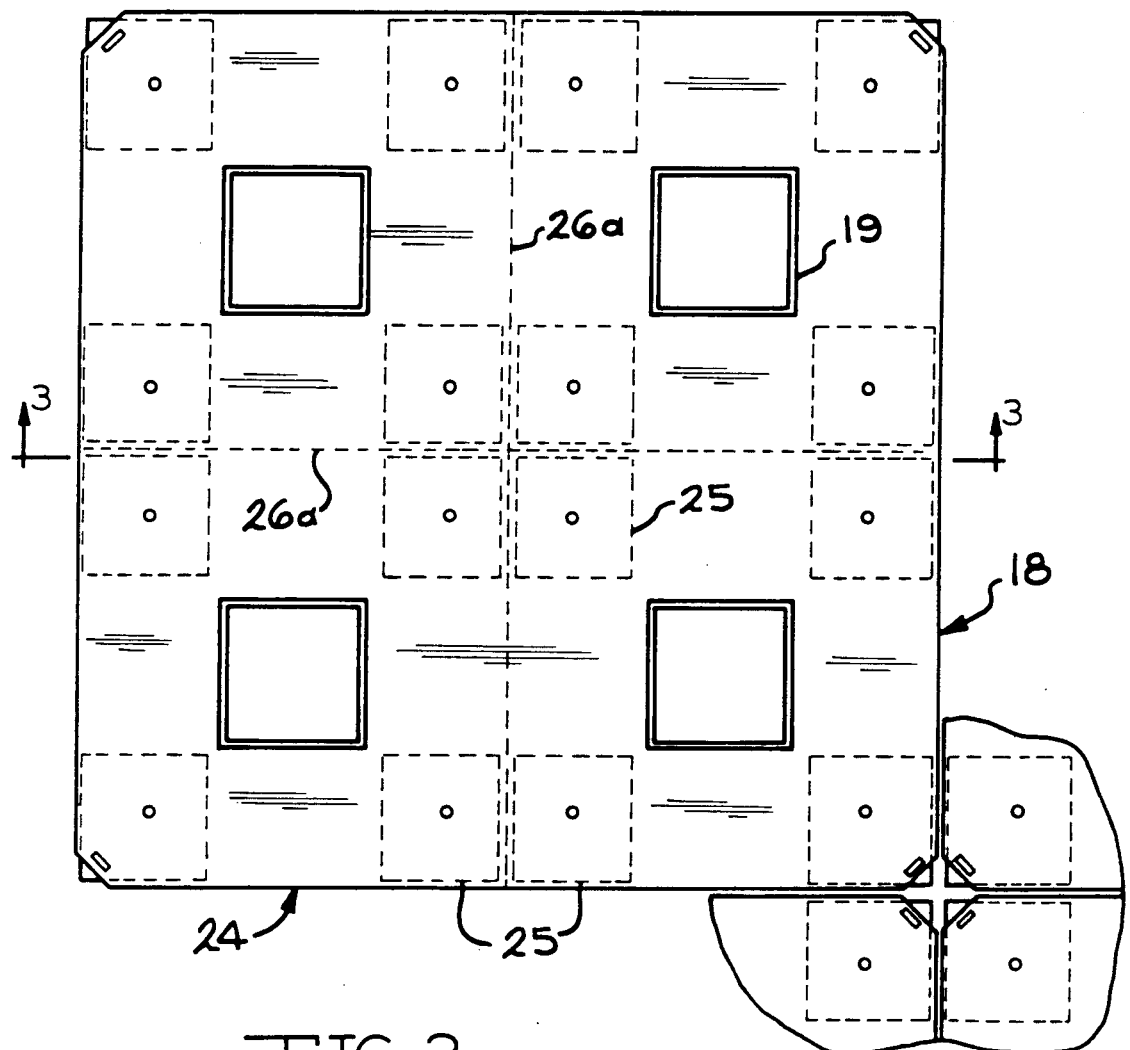
FIG. 2 is a plan view of the flooring system showing the fiber pads in dashed lines and a typical corner connection for the flooring panels.
Figure 3:
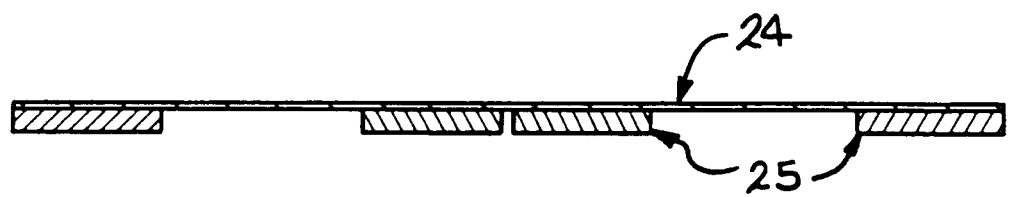
FIG. 3 is a sectional view taken along the line 3—3 of FIG. 2.

Referring now to FIGS. 2 and 3, the individual flooring panel 18 is shown in detail. Specifically, the preferred flooring panel is constructed of 12 gauge or 14 gauge metal 24 supported by pads 25 spaced about the underside of the panel in such a manner that a chase 12 is created. When the panels are attached together by clips 26, the chase 12 will extend between all the knockout plates 19 in a grid format. The pads 25 are preferrably composed of a compressed fireproof fibrous material such as pressed cellulose blocks.

The thin gauge of the metal 24 of the flooring panel 18 requires that the pads 25 engage a large enough percentage of the metal that remaining metal is structurally rigid during loading of the flooring panel by the usual assortment of office furniture and people. Preferably, each flooring panel 18 is 24 inches square and the pads 25 are 3½ to 4 inches square thereby providing that 34-44% of the metal panel 24 is supported by the pads 25 and 56 to 66 percent of the metal panel 24 remains open for a chase 12 area. This design will preferably provide a false floor capable of supporting 200 pounds per square foot. The large square pads, being composed of a fibrous material further provide excellent sound dampening for the false flooring system.

The floor panels 18 are designed to provide an overall profile or height over the base of between one-quarter of an inch and four inches. For applications where heights greater than four inches are required, it is quite sufficient to make use of one of the many prior art systems currently on the market. Further, the floor panels 18 are perforated by lines 26a located at one foot intervals. The perforations 26a coupled with the use of the pads 25 allow the flooring assembly 10 to be integrally strong, yet capable of flexing and conforming to the contour of the base floor. Also, since the individual floor panels 18 are interconnected by the clips 26, the individual panels 18 may be removed from the false floor assembly 10 so that the modular electrical whips 21 and distribution blocks 20 can be relocated in response to the electrical needs above the deck. Also, the linear grid of chases 12 located between the smooth sides of the pads 25 are conducive to providing guidance for sliding the electrical whip units 21 under the installed flooring panels 18 between access openings. After the whip units 21 are in place, they are then connected to the distribution blocks 20.

The knockout plates 19 are formed in the flooring panel 18 through perforations 19a. When it is found that there is a need to provide an access opening at a particular location, the perforations 19a are ruptured and the knockout plate 19 removed. The distribution block 20 is then connected to the modular whips 21 and positioned in the access opening.

Referring now to FIGS. 4, 5 and 6, the modular electrical whips 21 are composed of electrical wire 38 and end connectors 30. The end connectors 30 include the end connector housing 30, electrical contact pieces 27 that fit on the ends of each wire 38, and an insulating cover plate 29 that operates as a keying device for one-way-only connection. A metal cover 29a acts both as a grounding plate for the electrical system and a clip device for holding the end connector in place at the access opening 19. The actual connection of distribution block 20 to the end connector 30 of the modular electrical whip unit 21 is shown in FIGS. 11 and 12.

Figure 9:
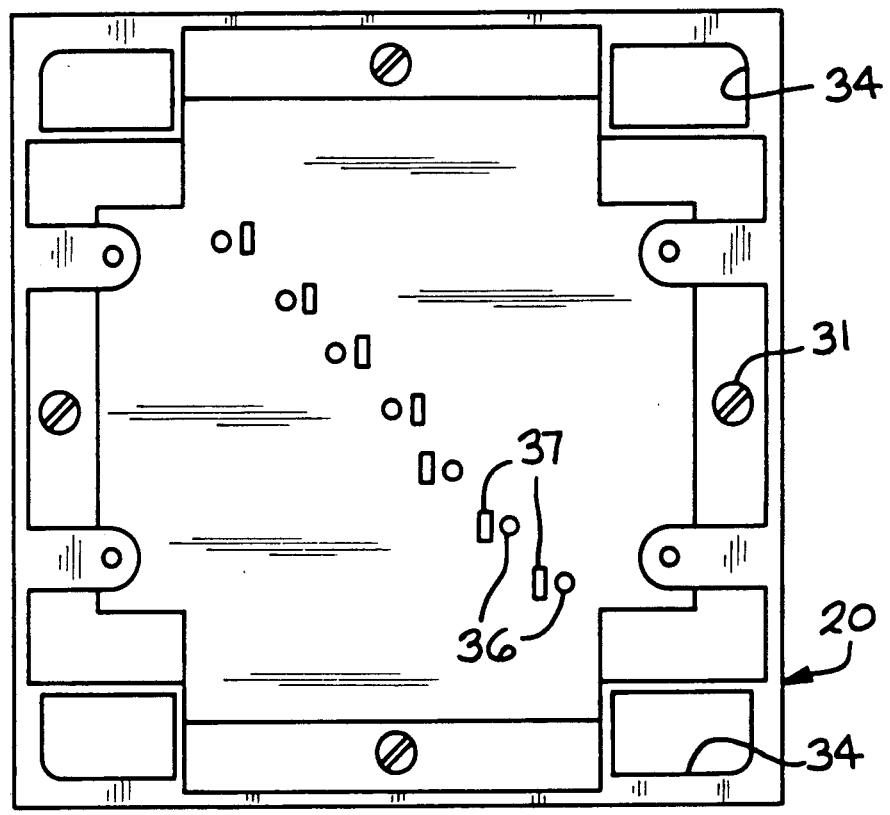
FIG. 9 is a top view of an electrical distribution block.
Figure 10:
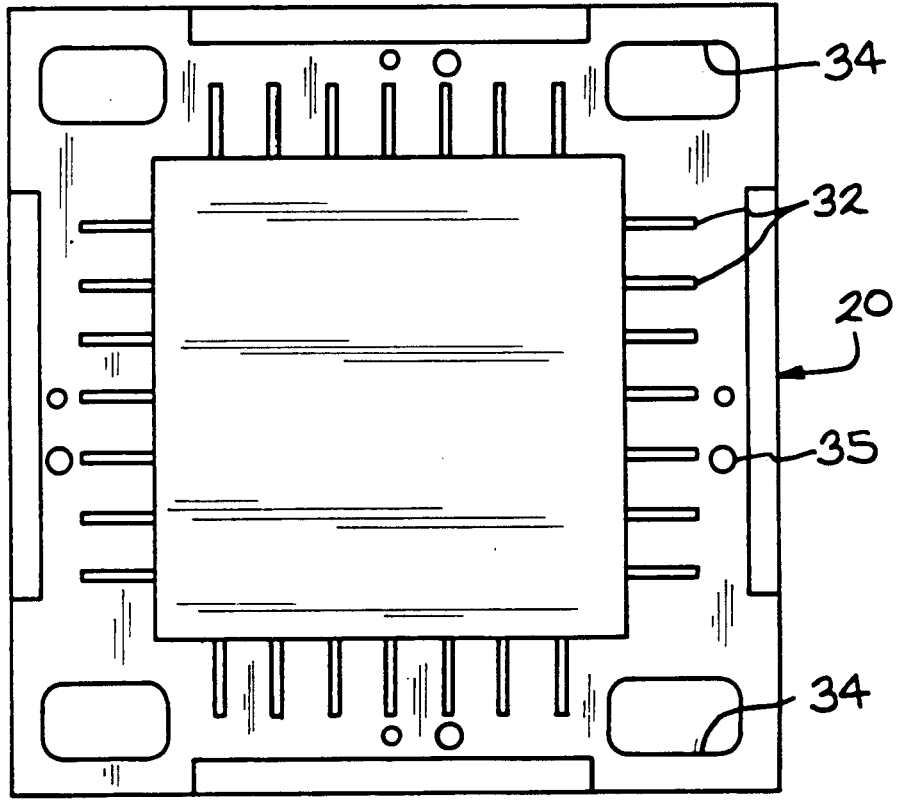
FIG. 10 is a bottom view of an electrical distribution block.

The distribution block 20 shown in FIGS. 9 and 10 is constructed of a housing which contains cross connecting wiring pieces 32 and access wiring points 36 for wiring into various circuits. The holes 37 provide for access, for instance by a screwdriver, to release the wires that are put in the access wiring points 36. The housing also includes a channel 34 which provides access between the base and the area above the false floor for miscellaneous wiring to be accessed. The cross connecting wiring assembly which fits within the housing is shown in FIGS. 13 and 14. The cross connecting wiring assembly is composed of metal pieces 32 with insulating material 41 between the cross-sectional layers. The metal pieces 32 contact together only at points where the wire holding clip 33 is shown. This structure allows electric current to flow through the distribution block in four directions and allows access to each circuit of the system from above.

Figure 11:
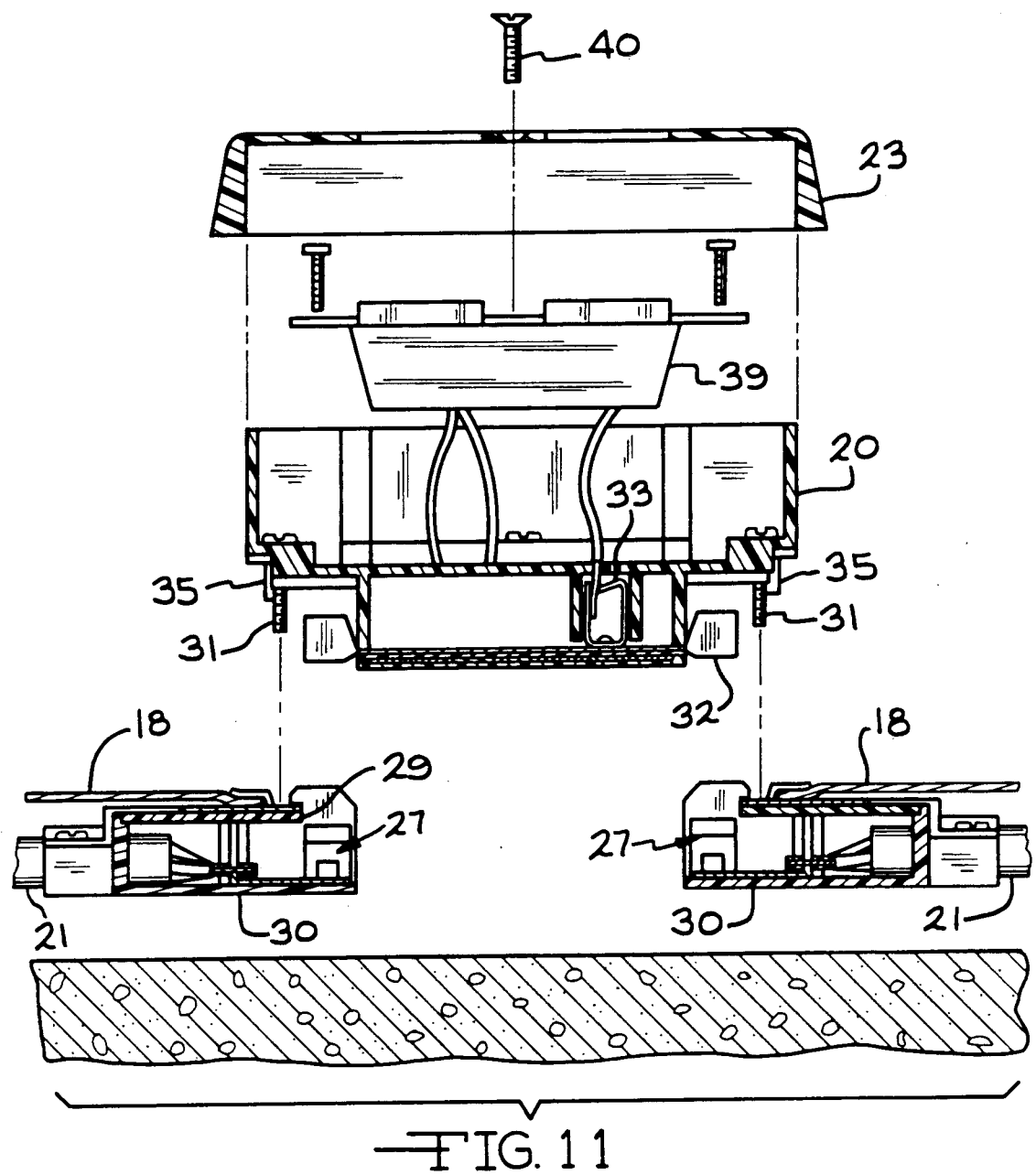
FIG. 11 is an exploded sectional view of end connectors, an electrical distribution block, a duplex outlet and a cover plate.
Figure 12:
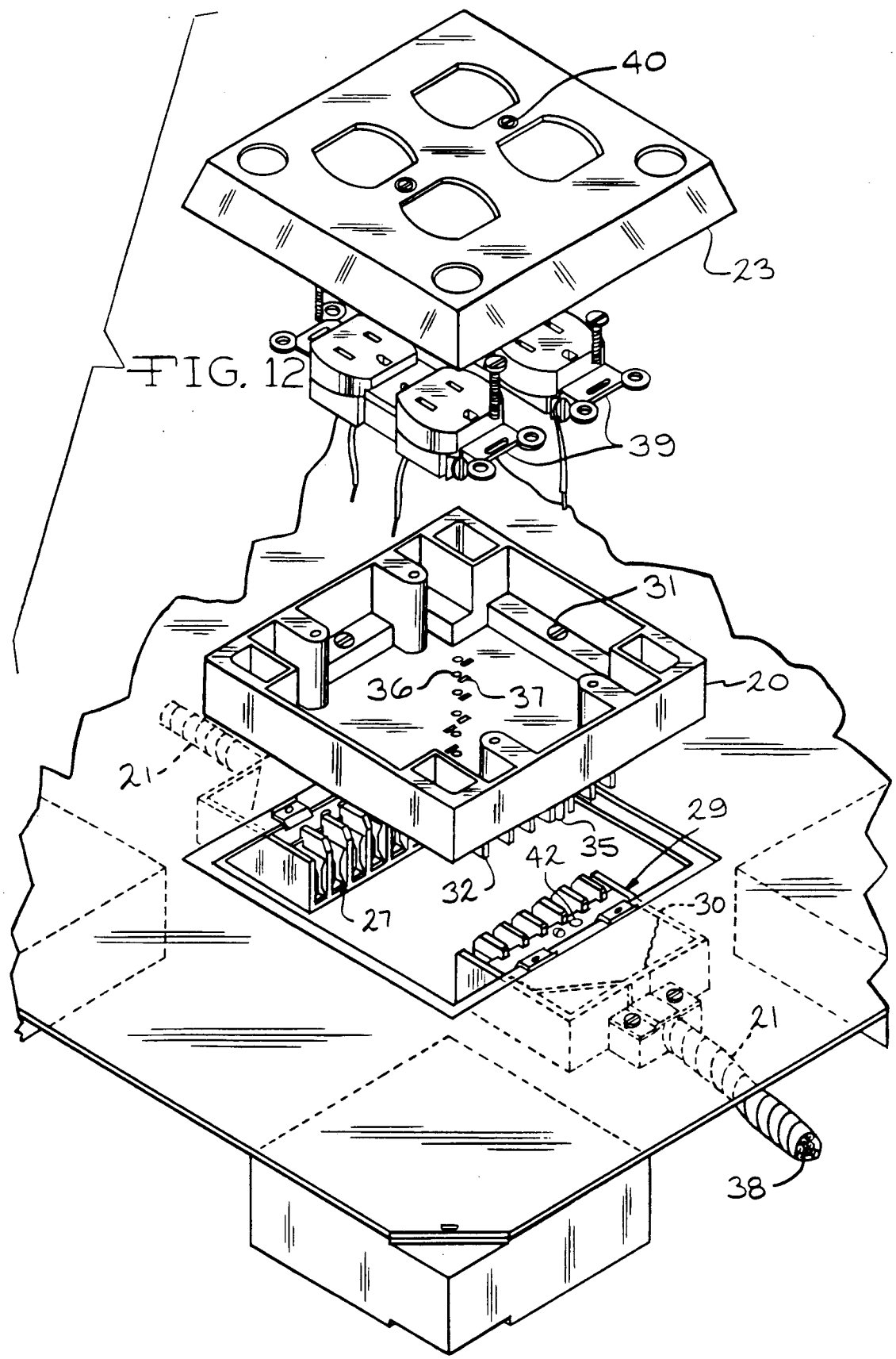
FIG. 12 is an exploded perspective view similar to FIG. 11.

As shown in FIG. 11, an electrical outlet 39 can be wired into the electrical system by connecting a wire from the outlet 39 through a wiring hole 36 to make contact with a wire holding clip 33 which contacts with the cross metal piece 32. The distribution block 20 is connected by screws 31 to the end connector 30 and the metal cross pieces 32 makes contact with the metal contact piece 27. A pin 35 located in hole 42 allows the assembly to be connected in only one orientation. As shown in FIG. 5, the metal contact piece 27 engages with the wires 38 which are in turn connected to the main power supply 22. Once the outlet 39, the distribution block 20 and the end connector 30 are all connected together, the cover 23 is secured in place with screws 40. The electrical equipment (not shown) located on the upper surface of the deck assembly 16 can receive electricity by being plugged into outlet 39.

It should be understood that the above description is of the preferred embodiment and that many changes and modifications may be made to the structure disclosed in the drawings and discussed herein and still fall within the scope of the following claims.

We claim:

1. A false flooring structure for use in placement over an existing base structure demanding a low profile raised flooring structure comprising:
   a plurality of deck units engaged together to form said flooring structure and means for interlocking said engaged deck units;
   each of said deck units including a flooring panel of determined thin cross-section and a plurality of fibrous pads for supporting said flooring panel placed in spaced relationship about said flooring panels, said fibrous pads having a total cross-sectional surface area engaged with said flooring panel sufficient to maintain structural rigidity of said flooring panel under a force bearing load at such portion of said panel not engaged with said fibrous pads and to maximize the height of the chase between said flooring panel and the base structure while maintaining the overall low profile of the flooring system;
   each of said flooring panels including at least one knockout member structurally connected with said flooring panel to provide a load bearing surface, said knockout member being removable from said flooring panel to provide an access opening to said chase;
   a cable means positioned in said chase for carrying electrical and telecommunications and data processing signals; and
   a distribution means for placement into said access opening and connecting to said cable means to provide for electrical and telecommunication and data processing accessibility above said false flooring structure.

2. The false flooring structure of claim 1, wherein said deck unit is positioned no less than one-quarter of an inch and no greater than four inches above such base structure.

3. The false flooring structure of claim 1, wherein said support pads are made of fire resistant pressed cellulose.

4. The false flooring structure of claim 1, wherein each of said deck units includes at least four knockout plates.

5. The false flooring structure of claim 1, wherein said electrical cable means includes a plurality of prewired moldular whip units, each whip unit having a pair of end connectors, each end connector having a plurality of electrical contact members, and an electrical whip having a plurality of electrical wires extending between said end connectors, each of said wires being connected between respective electrical contact members of each end connector.

6. The false flooring structure of claim 5, wherein said prewired modular whip units interconnect with said distribution means and said distribution means each provide for electrical current flow in any combination of one to four distinct directions and further provides for access to such electrical current from above said false flooring structure.

7. The false flooring structure of claim 5, wherein said distribution means includes a distribution block having at least one plug receptacle adapted to extend through said access opening, said distribution block being in communication with said prewired modular electrical whip units whereby electricity carried through said prewired modular electrical whip units is relayed through said distribution block to said plug receptacle to provide electrical accessibility above said false flooring structure.

8. The false flooring structure of claim 1, wherein said cable means can be distributed under the flooring panels without disassembling the false flooring structure.

9. The false flooring structure of claim 1, wherein said distribution means includes a channel extending from under said false flooring structure to above said structure, said channel providing for telecommunication and data processing and other desired wiring access from under such false flooring structure to above such structure.

10. The false flooring structure of claim 1, wherein said false flooring panel is constructed of 12 gauge metal.

11. The false flooring structure of claim 1, wherein said false flooring panel is constructed of 14 gauge metal.

12. The false flooring structure of claim 1, wherein said pads are at least $3\frac{1}{2}$ inches square.

13. The false flooring structure of claim 1, capable of supporting a loading force of at least 200 pounds per square foot.

14. The false flooring structure of claim 1, wherein said flooring panel is two feet square and is divided equally into four one foot square segments, each one foot square segment having pads of at least $3\frac{1}{2}$ inches square located in each corner and a knockout plate located proximate the center of said segment.

* * * * *